W. McDONALD.
TWO-WAY MOWER.
APPLICATION FILED FEB. 19, 1920.
1,354,052.
Patented Sept. 28, 1920.
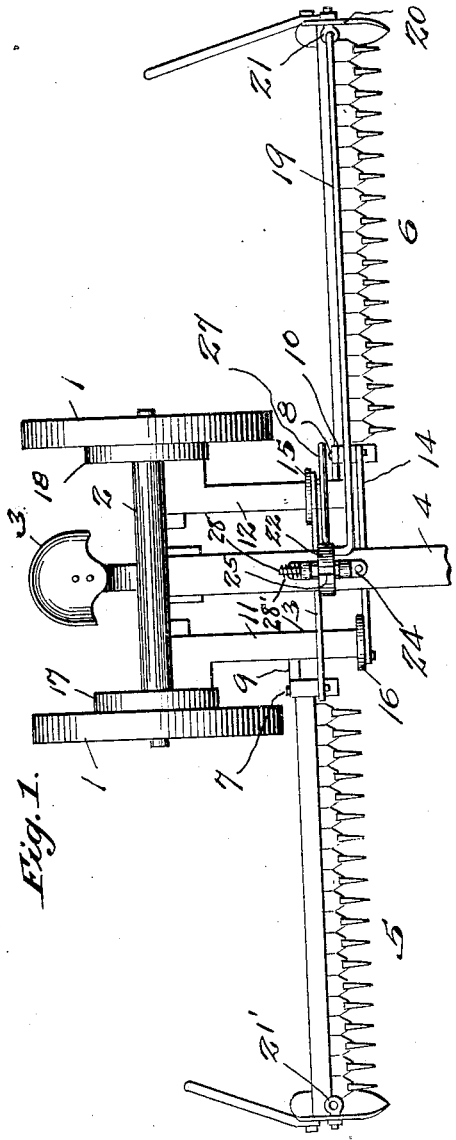
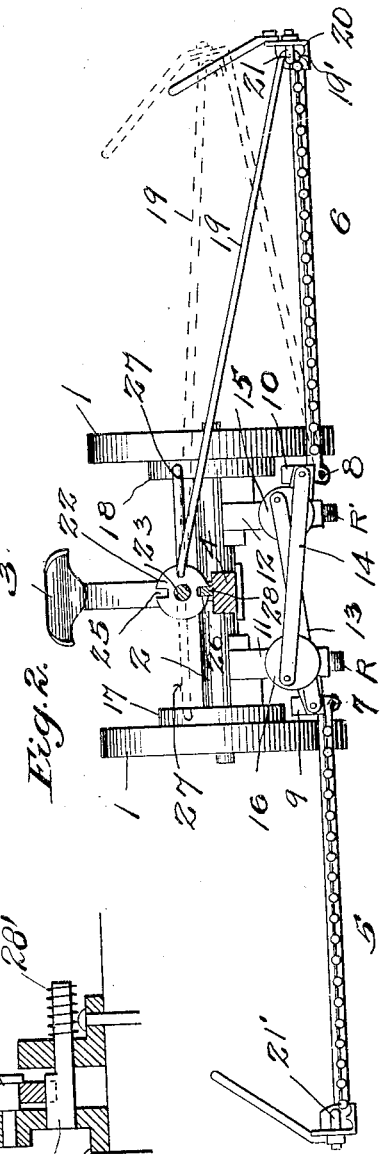
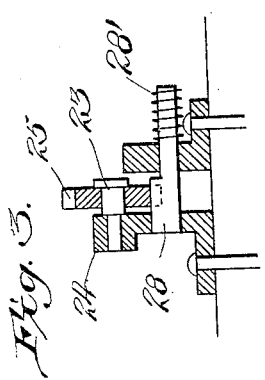
Inventor:
William Mc Donald
Fenelon B. Brock
Att'y.

UNITED STATES PATENT OFFICE.

WILLIAM McDONALD, OF TWIN FALLS, IDAHO.

TWO-WAY MOWER.

1,354,052.

Specification of Letters Patent. Patented Sept. 28, 1920.

Application filed February 19, 1920. Serial No. 359,957.

*To all whom it may concern:*

Be it known that I, WILLIAM McDONALD, of Twin Falls, in the county of Twin Falls and State of Idaho, have invented certain new and useful Improvements in Two-Way Mowers, of which the following is a full, clear, and exact description.

The present invention relates to an improved two way mower especially adapted to provide an implement by means of which the operator is enabled to mow across the field and return without the necessity of going around the field to cut a successive swath, and to this end the invention embodies the utilization of a pair of oppositely disposed cutter bars and operating mechanism, and means whereby the cutter bar which has been used to mow a swath in one direction, may be lifted to inoperative position in order that the other cutter bar may be used for cutting the next swath. In this manner the two way mower is used to cut a swath with the left hand cutter bar in one direction, and after the machine is turned around or reversed, the left hand cutter bar is lifted to inoperative position and the right hand cutter bar is utilized to cut the return swath.

In the accompanying drawings I have illustrated one complete example of the physical embodiment of my invention, wherein the parts are combined and arranged according to the best mode I have so far devised for the practical application of the principles of my invention. Only the necessary devices are illustrated for the purpose of exemplifying the invention, and many of the parts and mechanisms usually accompanying the standard form of mower and forming operative parts thereof, are omitted in the interest of clearness, and it will be understood that colorable changes and alterations may be made in the depicted structure, within the scope of my claims, without departing from the spirit of the invention.

Figure 1 is a plan view of a well known type of mower having the devices of my invention operatively connected therewith.

Fig. 2 is a front view in elevation of the implement according to my invention.

Fig. 3 is a detail view of the locking bolt.

In the preferred form of the invention as illustrated in the drawings I have utilized a well known form of machine or implement and converted it for use with my invention, it being understood that the invention may be applied to existing machines or manufactured and specially constructed in the factory as part of a new machine. In either event, the well known implement having the two traction wheels 1, 1, is employed, the wheels supporting the implement on the main frame 2, and the usual seat 3 is illustrated for the driver or operator. The draft tongue 4 may be used for the attachment of a single draft horse, or the implement may be of the two-horse type as desired, and equipped with a pair of oppositely disposed cutter bars 5 and 6 of well known type, that are permitted to float over the ground and supported at the front of the implement as by rollers R and R' in Fig. 2.

The cutter bars, at their inner ends, are provided with the usual pivoted or hinged couplings 7 and 8, respectively, that are supported on the brackets 9 and 10, and these latter brackets are carried at the lower ends of the complementary tubular casings 11 and 12, forming frame members in connection with the main frame, and inclosing the connecting mechanism or gearing, as for instance screw bars, for operating the cutter teeth of the two cutter bars.

The pitmen 13 and 14, supported on the casings 11 and 12, are of the usual strong and light material, and are connected to their respective disks 15 and 16, on shafts within the casings 11 and 12, to receive power from the internal gears 17 and 18 of the traction wheels, and transmit it to the reciprocal teeth of the cutter bars in usual manner.

The cutter bars 5 and 6 may be lifted or swung upwardly on their respective hinges 7 and 8, to elevate them from operative position, and also for the purpose of avoiding irregularities, stones, rocks, &c., in the path of the cutter bars, and for accomplishing this purpose I utilize a reversible lift bar 19, fashioned at its outer end with a detachable hook 19' and adapted for connection with the end 20 of the cutter bar through the instrumentality of an eye bolt 21 fixed to the end bar 20. In Figs. 1 and 2 the hook 19' is shown attached to the eye bolt 21, but it will readily be apparent that the bar may be shifted to the left side of the implement to couple with the eye bolt 21' when desired.

At its inner end, the lift bar is supported by a rotary or oscillatable disk 22, reversible on its shaft 23, when it is desired to swing the lift bar to the opposite side of the implement, and the shaft is supported in bearings 24 for this purpose, the bearings being attached at the upper side of the draft tongue in front of the driver's seat. In the periphery of the disk are arranged diametrically disposed notches 25 and 26, and the disk also has attached thereto a lift lever 27 by means of which the disk may be turned on its shaft to lift the cutter bar through the lift bar.

The disk may be held stationary, in adjusted position, to lock the cutter bar and lift bar, by any suitable means, and as one exemplifying device for this purpose I have shown a slide bolt 28, longitudinally disposed with relation to the tongue 4 and adapted to co-act with one or the other of the notches 25, 26 of the disk, by sliding into and out of operative engagement with the notched disk. As shown in the drawings, the cutter bar and lift bar are held or retained by the presence of the slide bolt 28 in the notch 26 of the disk, and to lift the cutter bar, the operator or driver first pushes the bolt out of engagement with the notched disk, (as by pressure from the toe of his shoe) then the lever 27 is grasped and swung upwardly, turning the disk, and through the instrumentality of the lift bar 19, the outer end of the cutter bar is lifted or elevated as the cutter bar swings on its hinge 8. A spring 28' may be utilized to return the bolt 28, automatically, to position to engage the notch 25 when the disk has been given a half-turn by swinging the lever 27 through an angle of 180° as indicated in dotted lines in Fig. 2, and as thus positioned the cutter bar and lift bar are held uplifted as indicated in dotted lines Fig. 2. A push on the slide bolt 28 releases the disk, and then the lever may be lifted from dotted position Fig. 2, swung over to full line position, and thus the cutter bar is restored to operative position. In this manner, when the mower reaches the end of a swath, the cutter bar that has been used, is lifted to inoperative position as the implement is turned around, and the opposite cutter bar, 5, is used in cutting the return swath.

The side of the field along which the initial cut is made determines the use of the selected cutter bar. Thus if the right hand cutter bar is to be used for the initial cut, the lift bar 19 is detached at 19'—21, and the disk, bar, and lever are swung over to the opposite side of the implement in Fig. 2, and the hook 19' coupled to the eyebolt 21', the lever then lying normally in dotted position of Fig. 2.

Having thus fully described my invention, what I claim and desire to secure by Letters Patent is—

1. The combination in an implement as described including the hinged cutter bar and tongue, of a lift bar pivoted at the free end of the cutter bar, an oscillatable disk supported on the tongue, said lift bar pivoted to the disk, and a lever attached to the disk, and means for holding the disk in stationary position.

2. The combination in an implement as described with the pivoted cutter bar, a notched rotatable disk and a retaining bolt to co-act with the notched disk, of a lift bar pivotally connected to the disk and to the free end of the cutter bar, and a lift lever attached to said disk.

3. The combination in a two way mower having a pair of oppositely disposed hinged cutter bars, of a reversible, notched disk and a retaining bolt to co-act with said disk, a lift bar pivotally connected to the disk and adapted for pivotal connection to the free end of a selected cutter bar, and a lift lever attached to said disk.

WILLIAM McDONALD.